(12) United States Patent
Patterson et al.

(10) Patent No.: US 12,010,984 B2
(45) Date of Patent: Jun. 18, 2024

(54) SYSTEM AND METHOD FOR CAPTURING A TARGET ANIMAL

(71) Applicants: Graham Patterson, Austin, TX (US); Brian Quispe, Bethlehem, PA (US)

(72) Inventors: Graham Patterson, Austin, TX (US); Brian Quispe, Bethlehem, PA (US)

(73) Assignee: Ocutrap Inc., Austin, TX (US)

( * ) Notice: Subject to any disclaimer, the term of this patent is extended or adjusted under 35 U.S.C. 154(b) by 107 days.

(21) Appl. No.: 17/453,198

(22) Filed: Nov. 2, 2021

(65) Prior Publication Data

US 2022/0142144 A1    May 12, 2022

Related U.S. Application Data

(60) Provisional application No. 63/111,814, filed on Nov. 10, 2020.

(51) Int. Cl.
| | | |
|---|---|---|
| *A01M 23/18* | (2006.01) | |
| *A01K 29/00* | (2006.01) | |
| *A01M 23/02* | (2006.01) | |
| *G06V 40/10* | (2022.01) | |

(52) U.S. Cl.
CPC ........... *A01M 23/18* (2013.01); *A01K 29/005* (2013.01); *A01M 23/02* (2013.01); *G06V 40/10* (2022.01)

(58) Field of Classification Search
CPC ...... A01M 23/18; A01M 23/02; A01M 23/16; A01K 29/005; G06V 40/10
See application file for complete search history.

(56) References Cited

U.S. PATENT DOCUMENTS

| | | | |
|---|---|---|---|
| 9,439,412 B2 * | 9/2016 | Kittelson | .............. A01M 23/18 |
| 2013/0205645 A1 * | 8/2013 | Gaskamp | .............. A01M 23/22 |
| | | | 43/62 |
| 2015/0313202 A1 * | 11/2015 | Perry | ........................ A01K 5/00 |
| | | | 43/60 |
| 2017/0231215 A1 * | 8/2017 | Barton | ................... G06V 40/10 |
| | | | 43/60 |
| 2019/0098874 A1 * | 4/2019 | Burton | .................. A01K 29/005 |
| 2019/0166823 A1 * | 6/2019 | Dick | ................. G06F 18/24133 |
| 2020/0253186 A1 * | 8/2020 | Files | ..................... A01M 19/00 |
| 2021/0029983 A1 * | 2/2021 | Deering | ............. A01M 31/002 |
| 2021/0076663 A1 * | 3/2021 | Chisholm | ............. A01M 23/38 |

* cited by examiner

*Primary Examiner* — Joshua J Michener
*Assistant Examiner* — Nicole Paige Maccrate
(74) *Attorney, Agent, or Firm* — Joseph E. Maenner; Maenner & Associates, LLC

(57) ABSTRACT

The present disclosure provides a smart animal capture device and system capable of determining whether an animal that has triggered a motion sensor is a desired target animal by taking a photograph and performing image recognition against an image database with images of the target animal species. The device is in wireless communication with a server and can thus be monitored and controlled remotely via a user device such as a mobile phone.

19 Claims, 6 Drawing Sheets

SYSTEM AND METHOD FOR CAPTURING A TARGET ANIMAL

BACKGROUND OF THE INVENTION

Field of the Invention

The present disclosure relates generally to the field of animal capture. More specifically the present invention relates to a system and method for determining whether a target animal is within an enclosure and closing the enclosure if the target animal is detected.

Description of the Related Art

Animal overpopulation and expensive crop damage have become a serious problem in many rural, suburban and urban areas. Conventional gates on trap enclosures are typically designed to be triggered and closed when an animal enters into the trap enclosure. Some traditional cage traps achieve this through the use of cellular trail cameras to determine that an animal has entered the cage and then automatically closing.

Currently available traps, however, have no mechanism for distinguishing harmless species and animals from the desired species or "target" animal. As many different kinds of animals will be attracted to the food bait that is left in the trap, this leads to many accidental trappings of the wrong type of animal, which simultaneously prevents the target animal from being captured as the trap has closed.

Furthermore, due to the fact that being caught can cause animals great stress and prevent them from finding food and water, traditional traps must be monitored and checked at least once every 24 or 48 hours in many U.S. states.

The foregoing problems with traditional traps lead to both a lack of efficiency and high maintenance costs.

It would be beneficial to provide a trap that can distinguish target animals from non-target animals and capture only the target animals, while allowing the non-target animals to leave the trap on their own.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides a smart animal capture device and system capable of determining whether an animal that has triggered a motion sensor is a desired target animal by taking a photograph and performing image recognition against an image database with images of the target animal species. The device is in wireless communication with a server and can thus be monitored and controlled remotely via a user device such as a mobile phone.

Thus, according to a first aspect of the present invention there is provided a device for capturing a target animal, the device comprising: an enclosure having a gate configured to move between an open position and a closed position; a motor unit connected to the gate of the enclosure and configured to drive the gate between the open position and the closed position; a wireless communication unit; a camera unit; a motion detector unit; and a controller. The controller is configured, in response to a detection from the motion detector unit indicating motion within the enclosure, to alternatively carry out one of: a first set of steps and a second set of steps. The first set of steps comprises the steps of:
  (a) alerting a user device of the detection via the wireless communication unit;
  (b) causing the camera unit to take a photo of the enclosure interior;
  (c) uploading the photo to a server via the wireless communication unit;
  (d) in response to the upload, receiving a message from the server indicating whether a target animal is detected in the photo; and
  (e) if the target animal is detected, causing the motor unit to close the gate.

Alternatively, the second set of steps comprises the steps of:
  (a) causing the motor unit to close the gate;
  (b) alerting a user device of the detection via the wireless communication unit;
  (c) alerting a user device of the detection via the wireless communication unit;
  (d) causing the camera unit to take a photo of the enclosure interior;
  (e) uploading the photo to a server via the wireless communication unit;
  (f) receiving a message from the user device indicating whether to open the gate or to leave the gate closed;
  (g) if the message indicates to open the gate, causing the motor unit to open the gate;
  wherein the set of steps taken by the controller is chosen based on a user-indicated preference for automated determination to perform the first set of steps, and, alternatively, a user determination to perform the second set of steps.

In some embodiments, the motion detector is located at the rear of the enclosure opposing the gate, and wherein a detection from the motion detector unit is only triggered for movement within a threshold distance from the rear of the enclosure.

In some embodiments, the controller is further configured to receive instructions from a user device to override the predefined steps and either open or close the gate.

In some embodiments, the enclosure is provided with a food storage unit and dispensing mechanism.

In some embodiments, the device is provided with an opaque protective covering.

In some embodiments, the device further comprises a light or noise emitting unit operable by the controller for encouraging animals to leave the enclosure.

In some embodiments, the device further comprises a solar unit for converting solar energy to power the operations of the device.

In some embodiments, the controller is further configured to carry out its own image recognition operations to determine whether a photo taken by the camera unit contains a target animal.

According to a second aspect of the present disclosure, there is provided a system for capturing a target animal. The system comprises a device according to the preceding embodiments; a user device comprising an interface for enabling a user to input settings and instructions for the device; and a server in wireless communication with the device and the user device. The server is configured to receive a target animal instruction from the user device and to receive an image from the device and carry out an image comparison operation on the received image to determine whether the received image contains a predefined target animal indicated in the target animal instruction by comparison with a plurality of images in the image database that are associated with the target animal.

In some embodiments, the target animal refers to a target species of animal.

In some embodiments, the interface of the user device is provided by a web application. A user may perform a variety of actions via the web application, including: setting the target animal for capture; setting the mode of determination for the device, viewing the received image of the device enclosure; causing the device door to open and close; monitoring a battery level and GPS location of the device; and viewing a feed of the device camera.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
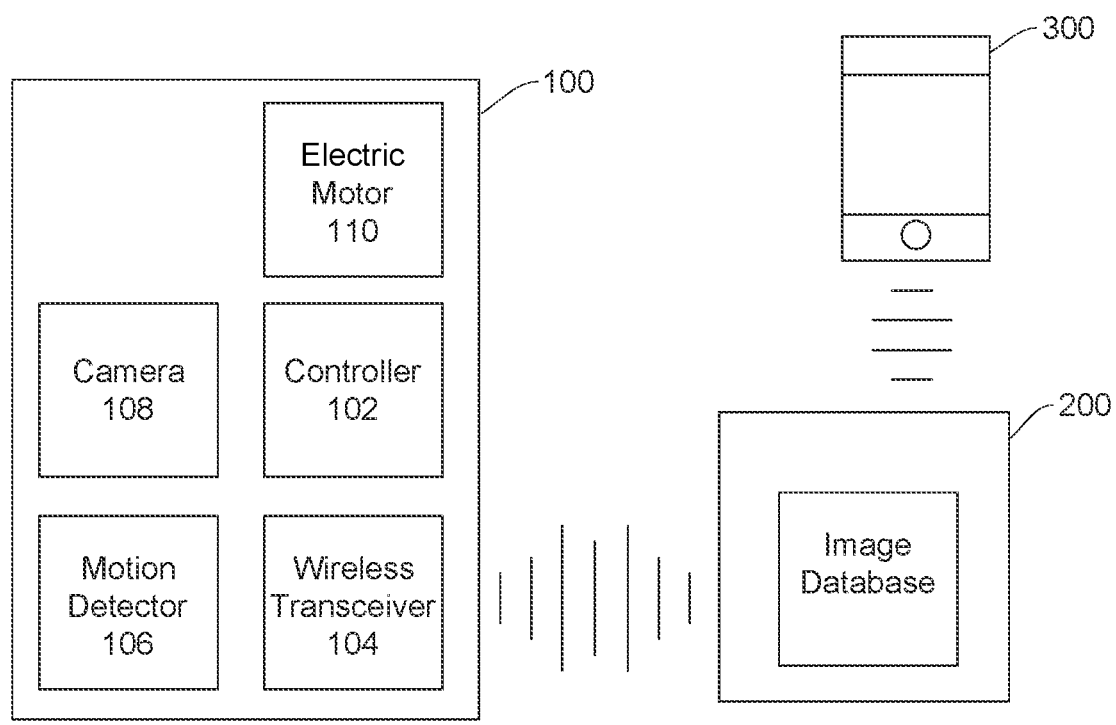
FIG. 1 illustrates an exemplary schematic configuration of a device for capturing a target animal of the present disclosure including a block diagram view of the device for capturing a target animal, an image recognition server, and a user device.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The operations described herein may be carried out by any processor. In particular, the operations may be carried out by, but are not limited to, one or more computing environments used to implement the method such as a data center, a cloud computing environment, a dedicated hosting environment, and/or one or more other computing environments in which one or more assets used by the method re implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing.

As used herein, the terms "controller", "microprocessor", "computing system", and "computing device", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

As used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

Unless specifically stated otherwise, as would be apparent from the above discussion, it is appreciated that throughout the above description, discussions utilizing terms such as, but not limited to, "activating", "accessing", "adding", "applying", "analyzing", "associating", "calculating", "capturing", "classifying", "comparing", "creating", "defining", "detecting", "determining", "eliminating", "extracting", "forwarding", "generating", "identifying", "implementing", "obtaining", "processing", "providing", "receiving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

The disclosed embodiments are illustrative, not restrictive. While specific configurations of the device for capturing a target animal have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

Referring to FIG. 1, an exemplary configuration of the system of the present disclosure including a block diagram view of the device 100 for capturing a target animal, an image recognition server 200, and a user device 300.

The device 100 comprises a controller 102, a wireless transceiver 104, a motion detector 106, a camera unit 108, and an electric motor 110. The controller 102, which may for example be a microprocessor, controls the operations of the device 100 as will be described below in greater detail.

The controller 102 is in wireless communication with a central server 200 via wireless transceiver 104, and carries out operations based on instructions received from the central server 200. Wireless transceiver 104 may enable communication by any suitable means of wireless communication, including but not limited to Wi-Fi, Bluetooth, LTE, 4G, and 5G. Whichever standard of communication is used, the controller 102 is capable of uploading images taken by camera unit 108 to the server 200.

The server 200 itself comprises at least one processing unit and has access to an image database 202. The image database 202 contains a plurality of images each being associated with a target animal, and is configured to carry out image comparison operations on images uploaded from the device 100 to determine whether a received image contains a specified target animal.

The server 200 is also in communication with a user device 300, which in the present example is illustrated as a smartphone but could take the form of any suitable device including tablets, laptops, PCs and other forms of computing devices. The user device 300 comprises an interface that allows a user of the user device 300 to control and interact with the device for capturing a target animal. This can be achieved by the server 200 relaying instructions received from the user device 300 to the device for capturing a target animal 100. The interface may be a web or mobile phone application built specifically for the purposes of controlling the capture device 100 or may be a simple SMS messaging system. The target animal for the capture device can be set via this interface, as can a host of other settings and instructions as will be explained in greater detail below.

The user device 300 may also receive notifications from the device 100 via SMS or the web interface, such as when a motion is detected by motion sensor 106.

Figure 2:
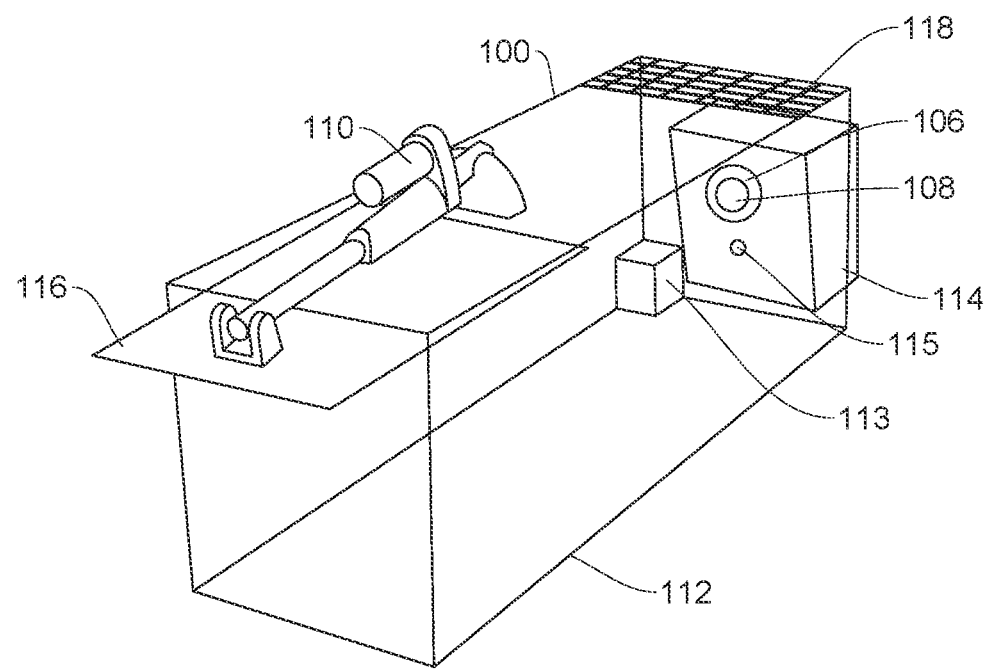
FIG. 2 illustrates a perspective view of an exemplary configuration of the device for capturing a target animal.

Referring to FIG. 2, a perspective view of an example configuration of the device 100 for capturing a target animal is shown.

The device comprises an enclosure 112 having a hardware case 114 which is preferably waterproof and impact resistant located at the rear end of the enclosure, the hardware case 114 containing the electrical components of the camera unit 108, a motion detector 106, which can, for example be an infra-red sensor or infra-red photoelectric sensor. The hardware case further contains electrical components not illustrated including the controller 102, and the wireless transceiver 104. Having the more delicate electrical components inside a hardware case 114 enables the device 100 to remain functional in various terrains and weathers.

At the front end of the enclosure 112 is a gate 116 attached to the electric motor unit 110. In the present example the electric motor unit 110 is a linear motor that is illustrated holding the gate 116 in an open position. The electric motor unit 110 may have a wired connection to the hardware case 114 in order to receive instructions from the controller 102.

The motion detector 106 is preferably always located at the rear of the enclosure 112 so that a threshold range can be set for motion detection that indicates an animal has moved a sufficient distance inside the enclosure 112 to safely close the gate 116 without harming the animal or letting it escape. In an exemplary embodiment, the animal has to be about one inch from motion detector 106 to trigger operation of gate 116.

As is common practice with animal trapping devices, food can be left inside the enclosure interior as bait. Furthermore, food and water storage units and dispensing mechanisms 113 can be included to ensure a captured animal is not starved or dehydrated while caught inside the device.

Additionally, the side walls and roof of the device 100 may be opaque, which serves the dual purpose of keeping a captured animal calm during transport of the device and preventing a person holding the device from being bitten or scratched by caught animals.

In some embodiments, the device 100 further comprises a stimulus emitting unit 115 operable by the controller 102 for encouraging animals to leave the enclosure. The stimulus can be at least one of light or noise. For example, the unit can emit buzzing noises or produce flashing lights within the enclosure interior if an animal having been attracted to the bait is determined not to be the target animal.

The device 100 will also need electrical power to function and is preferably battery powered to improve portability. Solar panels 118 or other power generating mechanisms suitable for outdoor use may be included with the device 100 for maintaining battery level during extended periods of use.

The operations of the system that allow specific target animals to be captured using the device will now be described.

As mentioned above, a user may interact with the device 100 via a web application to determine various settings and apply controls for the device 100. SMS messaging and even manual control may also be used, however the following examples will be illustrated using the user device 300 web application for an interface.

The user first sets one or more target animals, e.g. one or more different species of animal such as raccoons or rats. The user then selects whether they would like the device 100 to operate entirely autonomously, determining whether a target animal is captured based purely on image recognition, or whether confirmation should be asked via the interface of the user device 300. It should be noted that a user can manage multiple devices simultaneously via the same interface and user device 300.

Figure 3:
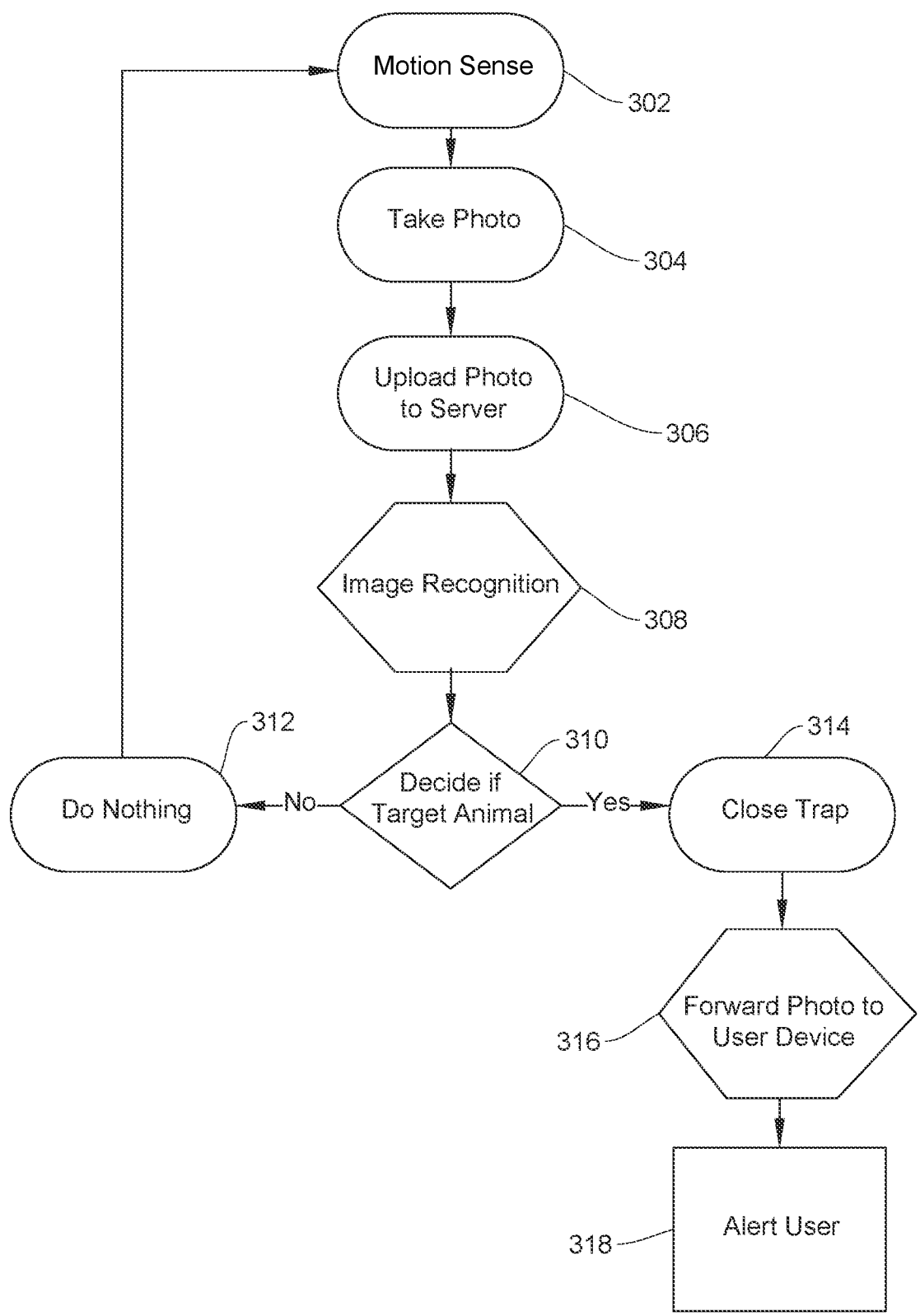
FIG. 3 illustrates a flow diagram of an example set of steps taken by the controller of the device for capturing a target animal for an autonomous mode.

Referring to FIG. 3, a flow diagram of an example set of steps taken by the controller 102 of the device 100 for capturing a target animal is shown for the autonomous mode setting.

In step 302, a detection from the motion detector unit indicating motion within the enclosure is notified to the controller 102.

The controller responds by sending a notification to the user device 300 via the server 200.

In step 304, the controller causes the camera unit 108 to take a photo of the interior of the enclosure 112 to identify if the predefined target animal is within the enclosure 112.

In step 306, the controller 102 uploads the photo to the server 200 via the wireless communication unit. The controller 102 may also specify the target animal that has been set by the user for the present operation by the user.

In step 308, the server 200 performs image recognition on the received photo by comparing it to a plurality of images known to be of the target animal from the image database 202.

In step 310, the server determines whether the animal is the target animal and based on the determination sends an instruction to the controller 102.

In step 312, if the animal was determined not to be the target animal the controller does not close the gate 116, and if the animal was determined to be the target animal, in step 314 then the controller 102 controls the motor unit 110 to shut the gate 116. If the animal was determined to be the target animal a further notification may also be sent to the user device 300 in steps 316, 318.

Figure 4:
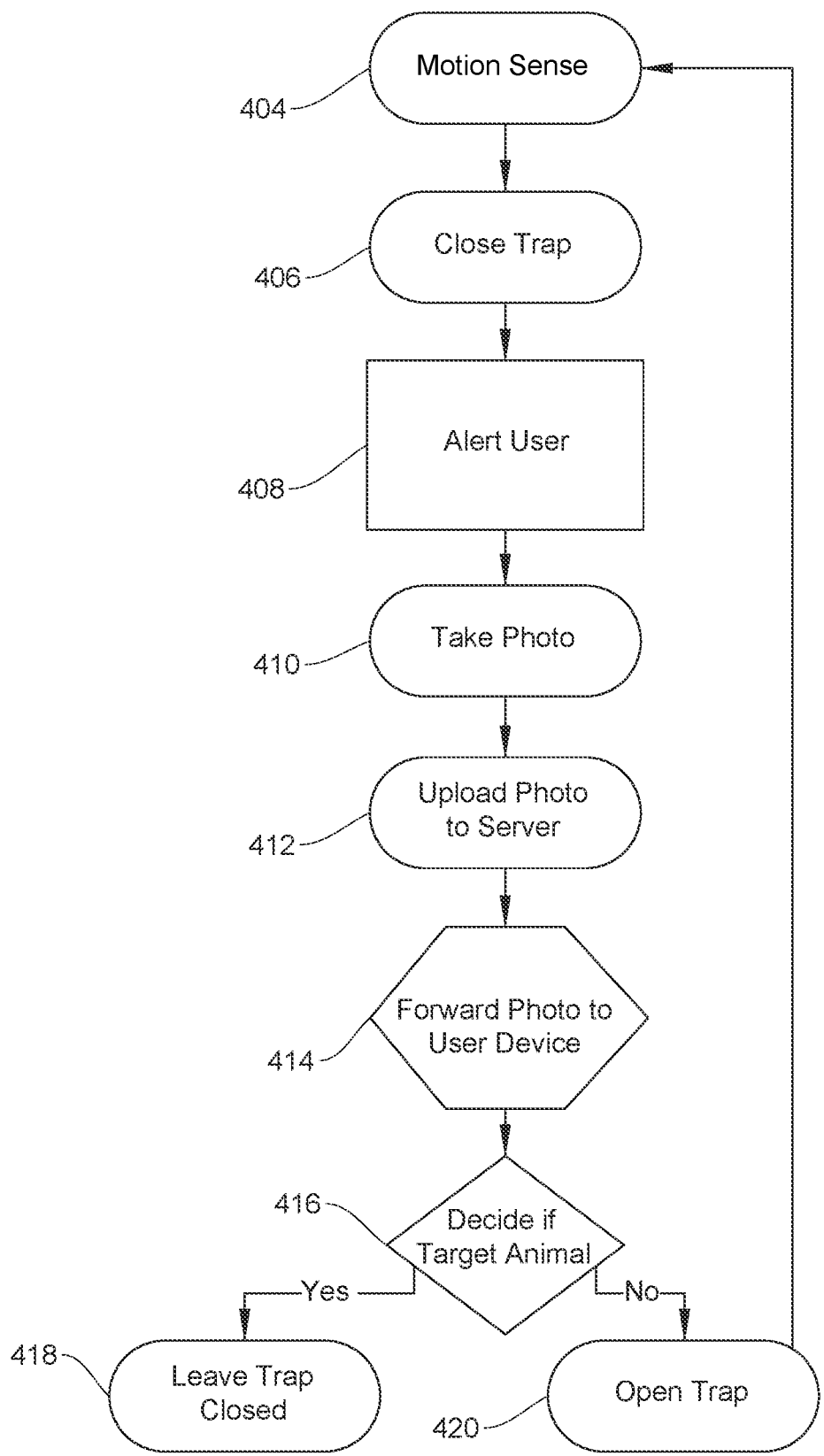
FIG. 4 illustrates a flow diagram of an example set of steps taken by the controller of the device for capturing a target animal for a non-autonomous mode.

Referring to FIG. 4, a flow diagram of an example set of steps taken by the controller 102 of the device 100 for capturing a target animal is shown for the non-autonomous mode setting.

In step 402, a detection from the motion detector 106 indicating motion within the enclosure is notified to the controller 102.

In step 404, the controller 102 causes the motor unit 110 to shut the gate 116 of the enclosure 112.

In step 406, the controller 102 sends a notification to the user device 300 that the gate 116 has been closed.

In step 408, the controller 102 causes the camera unit 108 to take a photo of the enclosure interior to identify if the predefined target animal is within the enclosure.

In step 410 the controller uploads the photo to the server 200 via the wireless communication unit.

In step 412 the photo is forwarded to the user device 300.

In step 414 the user must select whether the animal is the target animal or not via the user device interface.

After step 414, if the user determined that the target animal was trapped and selected that option then the controller does not open the gate in step 416. On the other hand, if the user determined that the target animal was not trapped and selected the other option then the controller causes the motor unit 110 to reopen the gate to release any accidentally captured animal and reset the device in step 418.

Figure 5:
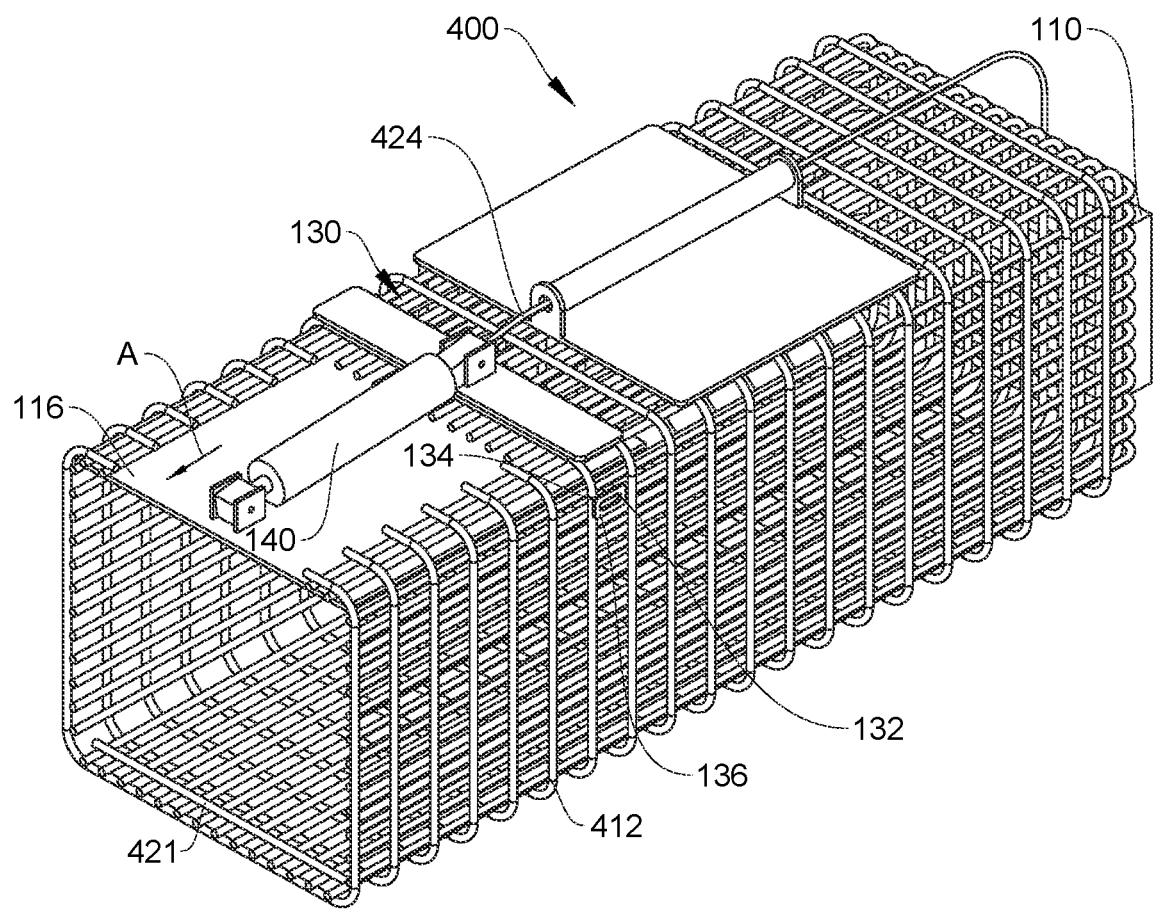
FIG. 5 illustrates a perspective view of an exemplary embodiment of a device for capturing a target animal with the gate in an open position.
Figure 6:
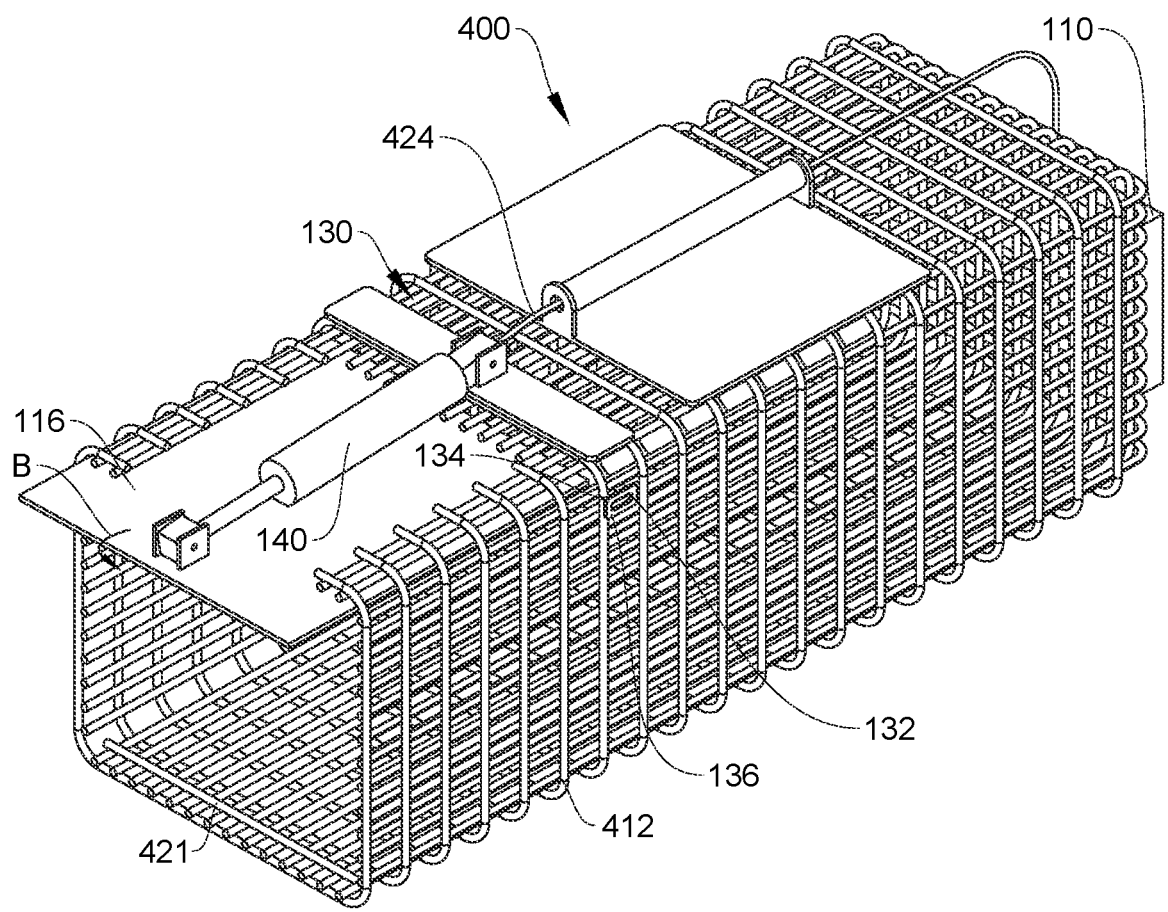
FIG. 6 illustrates a perspective view of the device of FIG. 5 with the gate moving toward a closed position.
Figure 7:
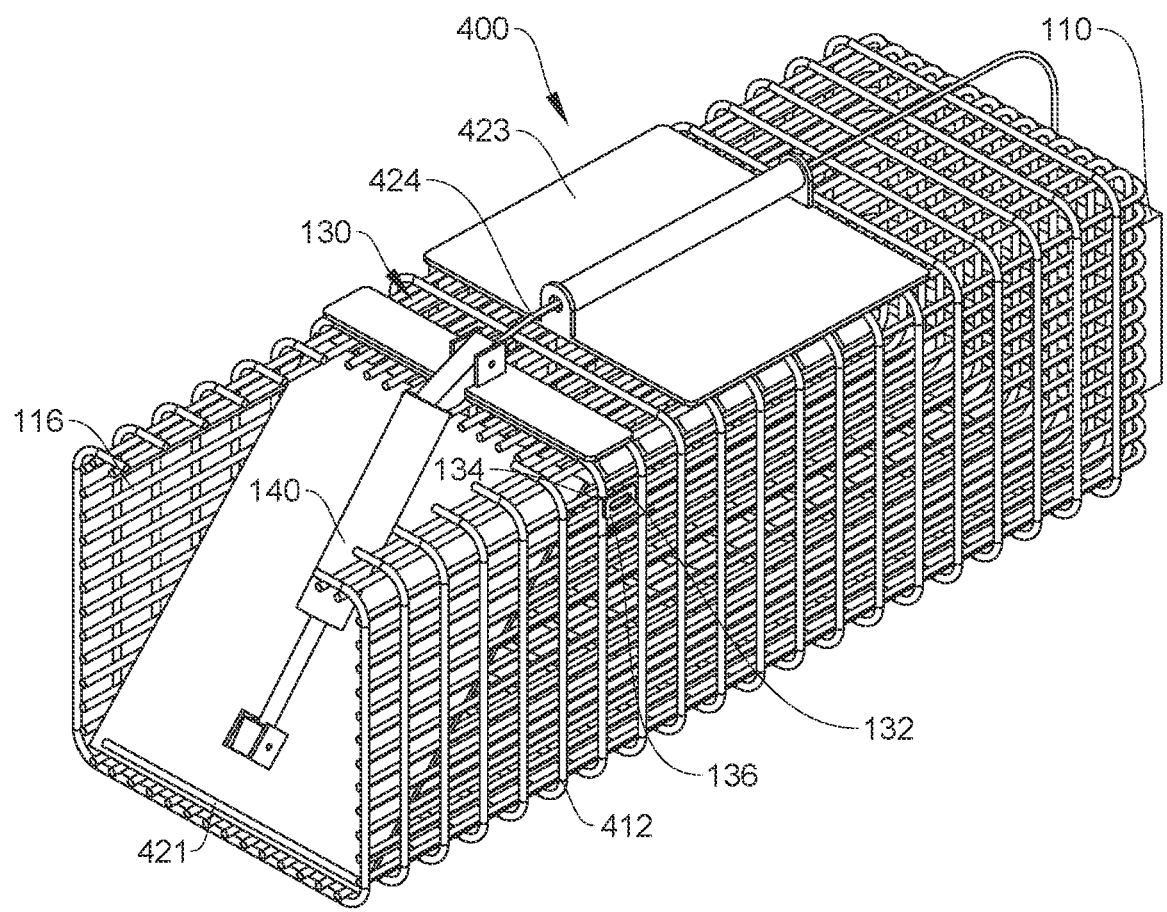
FIG. 7 illustrates a perspective view of the device of FIG. 5 with the gate in the closed position.

Physical operation of gate 116 will now be described. Referring to FIGS. 5-7, an exemplary operation of gate 116 is shown. Gate 116 is mounted inside of a device 400 that has wire mesh walls instead of opaque walls as described above with respect to enclosure 112. Also, optionally, a handle 422 can be provided on a bracket 423 to facilitate lifting and moving of device 400.

Gate 116 maintains two primary positions: open and closed. Gate 116 is pivotally attached to device 400 at a top end 130 of gate 116 by an upper rod 132 that extends across the width of device 400. The rod 132 is restricted by oval holes 134 on brackets 136 mounted on opposing sides of enclosure 412. The upper rod 132 laterally translates along oval holes 134 from a first position when the gate 116 is open to a second position when the gate 116 is closed.

The motor unit 110 comprises a linear actuator 140 mounted on the top of enclosure 412 such that, when the linear actuator 140 is in a retracted position as shown in FIG. 5, the gate 116 is open and when the linear actuator 140 is in an extended position as shown in FIG. 7, the gate 116 is closed. A power cable 424 can extend from motor controller 110, through handle 422, and to linear actuator 140 to power linear actuator 140.

A lower rod 421 extends across the enclosure 112 such that, when the gate 116 is in the closed position as shown in FIG. 7, the lower rod 421 prevents the gate 116 from opening from inside the enclosure 112. This feature prevents an animal caught inside enclosure 112 from pushing on gate 116 to pivot gate 116 to an open position so that the animal can escape device 400.

In the open position, the linear actuator 140 is fully retracted and the gate 116 is in a horizontal position to allow animals to enter into the enclosure 112. The upper rod 132 is in a position closest to the motor unit 110, limited by the brackets 136. The transition from open to closed starts happens in two stages once a signal from the motor unit 110 to extend the linear actuator 140 to move the gate 116 to the closed position occurs. First, the gate 116 advances away from controller 110 as shown by arrow "A" in FIG. 56. Next, gate 116 rotates approximately 45 degrees around the upper rod 132 toward the bottom of the enclosure 112, as shown by arrow "B" in FIG. 6 until the gate 116 and enclosure 112 are in contact. Secondly, the upper rod 132 slides along holes 134 in the bracket 136 in a direction away from the motor unit 110 to slide the gate 116 laterally in a horizontal movement toward the lower rod 421. At the end of the stroke of linear actuator 140, the gate 116 is fully closed and the horizontal and rotational movement is blocked by the lower rod 421. The gate 116 can be opened in a reverse process of what is described above.

The purpose of the mechanism is to allow the user/system control of the state of the gate 116 and to prevent animals from entering or exiting enclosure 412 when the gate 116 is in the closed position. The entire process of opening or closing the gate 116 takes a short amount of time to prevent the animal from escaping while the transition of the position of gate 116 is occurring.

As mentioned above, a user may perform a variety of other actions for interfacing with the device 100 via the web application, including: setting the target animal for capture; setting the mode of determination for the device, viewing the received image of the device enclosure; causing the device door to open and close; monitoring a battery level and GPS location of the device; and viewing a feed of the camera unit 108.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A device for capturing a target animal, the device comprising:
    a portable enclosure having a gate configured to move between an open position and a closed position;
    a motor unit connected to the gate of the enclosure and configured to drive the gate between the open position and the closed position;
    a wireless communication unit operatively coupled to the motor unit;
    a controller;
    a camera unit operatively connected to the controller; and
    a motion detector unit operatively connected to the camera unit;
    wherein the controller is configured, in response to a detection from the motion detector unit indicating motion within the enclosure, to carry out a set of steps,
    wherein the set of steps comprises, in an autonomous mode, in the order listed:
        (a) alerting a user device of the detection of an animal inside the enclosure via the wireless communication unit;
        (b) causing the camera unit to take a photo of the enclosure interior, generating an image;
        (c) uploading the image to a server via the wireless communication unit, the server having an image database of other images of target animals stored therein;
        (d) in response to step (c), receiving a message from the server indicating whether a target animal is detected in the image; and
        (e) if the target animal is detected, causing the motor unit to close the gate and retain the target animal in the enclosure and, if the target animal is not detected, maintaining the gate in an open condition and emitting a stimulus to encourage the animal to leave the enclosure.

2. The system according to claim 1, wherein the motor unit comprises a linear actuator such that, when the linear actuator is in a retracted position, the gate is open and when the linear actuator is in an extended position, the gate is closed.

3. The system according to claim 2, wherein the gate is pivotally mounted on an upper rod such that the upper rod laterally translates from a first position when the gate is open to a second position when the gate is closed.

4. The system according to claim 3, further comprising a lower rod extending across the enclosure such that, when the gate is in the closed position, the lower rod prevents the gate from opening from inside the enclosure.

5. The system for capturing a target animal, the system comprising:
    the device according to claim 1;
    the user device comprising an interface for enabling a user to input settings and instructions for the device; and
    the server in wireless communication with the device and the user device, the server being configured to receive a target animal instruction from the user device and to receive the image from the device and carry out an image comparison operation on the image to determine whether the image contains the target animal by comparison with the other images in the image database.

6. The system according to claim 5, wherein the target animal refers to a target species of animal.

7. The system according to claim 5, wherein the interface of the user device is provided by a web application.

8. The system according to claim 7 wherein the user may set the target animal via the web application.

9. The system according to claim 7 wherein the user can set the mode of determination for the device of claim 1 via the web application.

10. The system according to claim 7, wherein the user can view the received image of the device enclosure via the web application.

11. The system according to claim 7, wherein the user can monitor a battery level and GPS location of the device via the web application.

12. The system according to claim 7 wherein the user can view a feed of the device camera via the web application.

13. The device for capturing a target animal according to claim 1, wherein the motion detector is located at a rear of the enclosure opposing the gate, and wherein a detection from the motion detector unit is only triggered for movement within a threshold distance from the rear of the enclosure.

14. The device for capturing a target animal according to claim 1, wherein the controller is further configured to receive instructions from the user device to override the predefined steps and either open or close the gate.

15. The device for capturing a target animal according to claim 1, wherein the enclosure is provided with a food storage unit and dispensing mechanism.

16. The device for capturing a target animal according to claim 1, wherein side walls and a roof of the device are opaque.

17. The device for capturing a target animal according to claim 1, further comprising a stimulus emitting unit operable by the controller for encouraging animals to leave the enclosure.

18. The device for capturing a target animal according to claim 1, further comprising a solar unit for converting solar energy to power the operations of the device.

19. The device for capturing a target animal according to claim 1, wherein the controller is further configured to carry out its own image recognition operations to determine whether a photo taken by the camera unit contains the target animal.

* * * * *